April 16, 1935.   A. C. PETERSON   1,997,698
VARIABLE FREEWHEELING TRANSMISSION MEANS
Filed Dec. 24, 1931   2 Sheets-Sheet 1
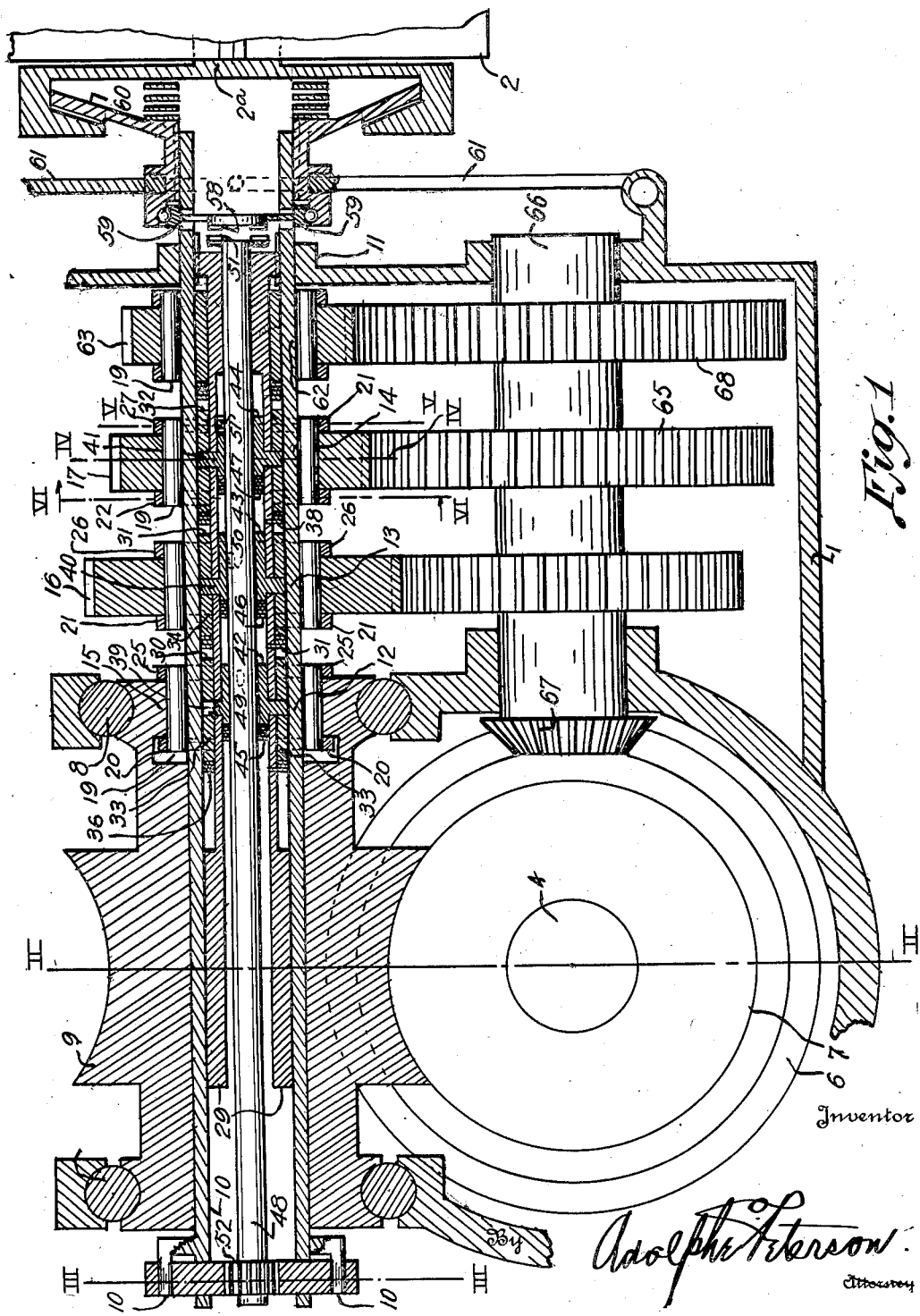

April 16, 1935.   A. C. PETERSON   1,997,698
VARIABLE FREEWHEELING TRANSMISSION MEANS
Filed Dec. 24, 1931   2 Sheets-Sheet 2
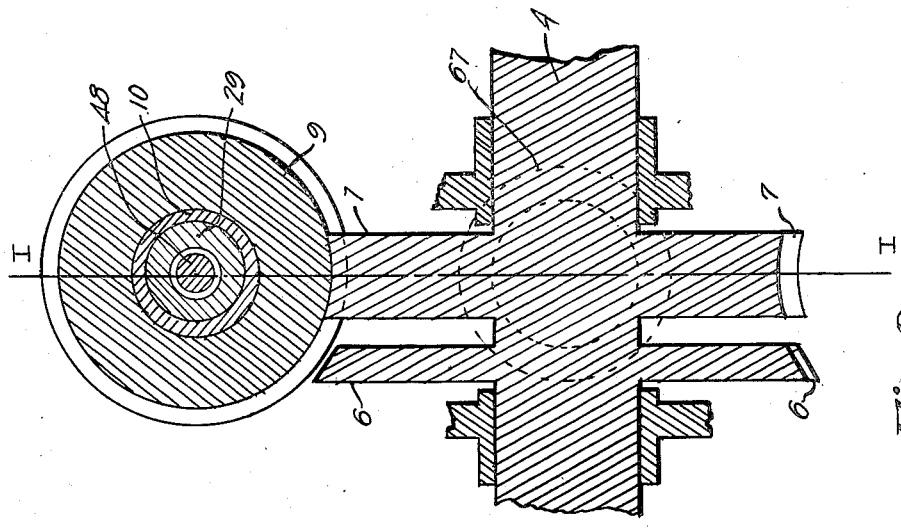
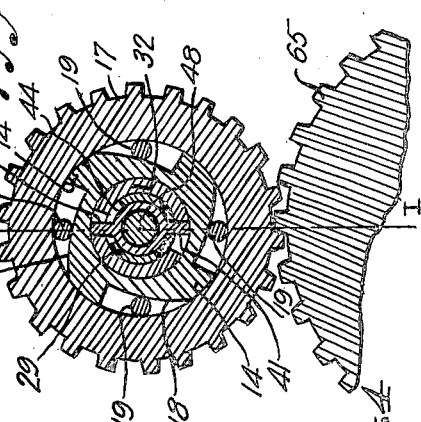
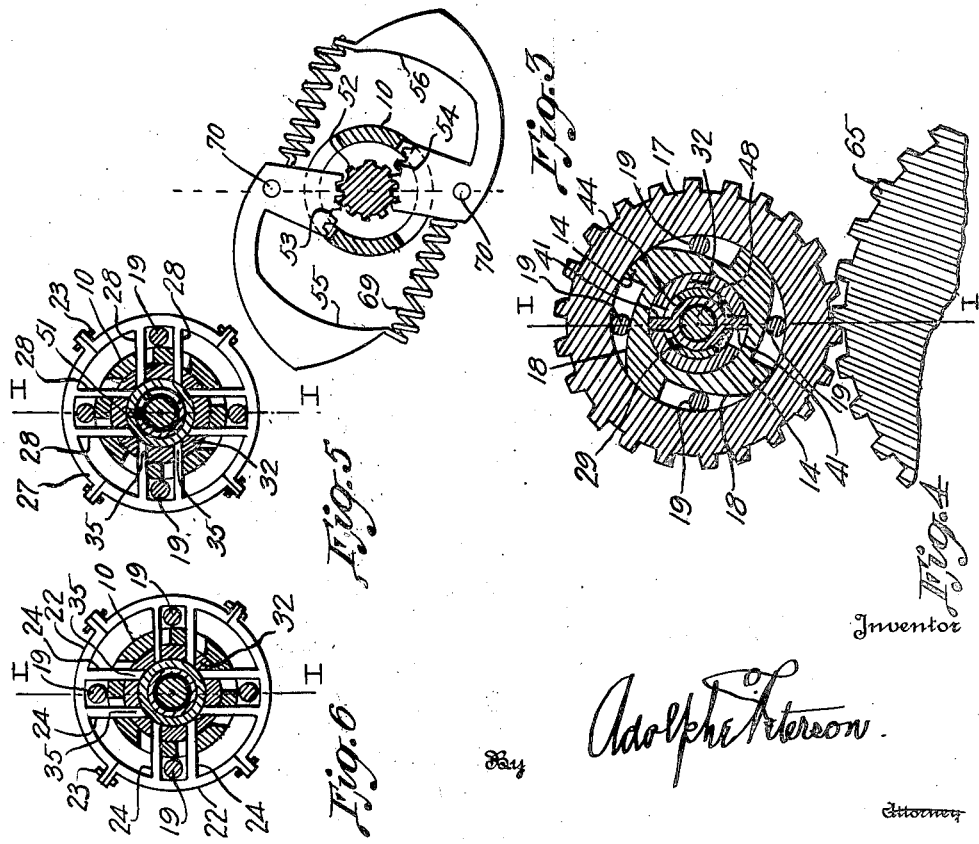
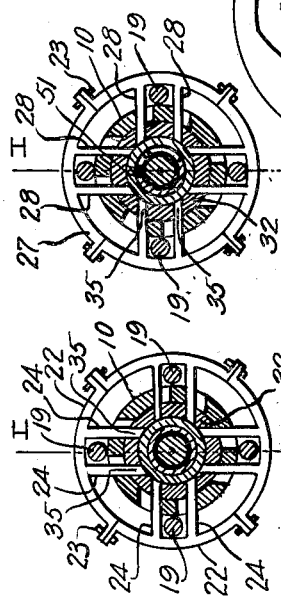
Inventor
Adolphe Peterson
By
Attorney Patented Apr. 16, 1935

1,997,698

UNITED STATES PATENT OFFICE 1,997,698

VARIABLE FREEWHEELING TRANSMISSION MEANS

Adolphe C. Peterson, Minneapolis, Minn.

Application December 24, 1931, Serial No. 582,975

15 Claims. (Cl. 74—336.5)

My invention relates to transmission devices and particularly to a variable means employing particularly free wheeling means wherefore it is called variable free wheeling transmission means. The particular object is to provide a transmission means which shall be simple in construction, cheap in manufacture, while having particular features of transmission. A particular object is to provide a variable transmission means which shall be automatically variable in the transmission ratio without any act of the operator save only in some constructions the release of a main clutch or the release of the accelerator pedal, this manual act being in other constructions of the device dispensed with. An object is to provide a transmission means which shall automatically in accordance with the speed of travel take up the next higher ratio of transmission. An object is to provide an improved free wheeling transmission means where the same is applied to the variable operation of the device. An object is to provide a transmission means which shall be more direct in transmission in some of the ratios than the usual form of variable transmission is.

The principal devices and combinations of devices comprising my invention are as hereinafter described and as defined in the claims. In the accompanying drawings which illustrate my invention like characters refer to like parts throughout the several views.

Referring to the drawings:

Figure 1 is a view chiefly in vertical section through the axial lines of the principal operating parts of the device.

Figure 2 is a view in vertical cross section at right angles to that of Figure 1 on line II—II of Figure 1.

Figure 3 is a detail view showing particularly the governor arms 55 and 56 and their related apparatus in a plane at right angles to the plane of Figure 1, some parts being shown in cross section on the line III—III of Figure 1.

Figure 4 is a section at right angles to the plane of Figure 1 and on the line IV—IV of Figure 1.

Figure 5 is a section at right angles to the plane of Figure 1 and on the line V—V of Figure 1, some parts in full side elevation.

Figure 6 is a section at right angles to the plane of Figure 1 and on the line VI—VI of Figure 1 some parts in full side elevation.

Referring again to the drawings, the numeral 1 indicates the case of a transmission means which may be associated with an engine 2 diagrammatically shown only, and is contemplated to illustrate the application of a transmission and engine to driving either of front axle driving means or rear engine driving means driving through the rear axle. The device is particularly adapted to the direct front driving vehicle or the direct rear engine rear wheel driving means.

Associated with the case 1, rotatably mounted therein, is a driving axle 4. The driving axle 4 has secured upon it for the driving thereof a large mitre gear 6 and a large worm wheel 7 by either of which the driving torque may be transmitted as hereinafter described. Above the worm wheel 7 there is rotatably mounted in the bearings 8 a worm 9 which is in driving relation with the worm wheel 7. In axial alignment with the worm 9 there is mounted a so-called carrier shaft 10 rotatable in a bearing 11 at one end and in the end of the worm 9 at the other end.

The carrier shaft 10 has formed integrally with it at three different transverse sections the so-called free wheel cam wheels 12, 13, 14 with which are associated three units, the worm drum 15 fixed with worm 9, the spur gear 16, and the spur gear 17, each of these being rotatable relative to the carrier shaft 10 except under the driving conditions as hereinafter described. Each cam wheel 12, 13, 14 has a plurality of cams 18 inclined relatively to the circle about the axis of the carrier shaft and these cams are in the case of either equidistantly spaced about the cam wheel. Between the cam wheel 12, 13, 14 as the case may be and the related drum or spur gear there are located as many sets of varying diameter rollers 19 as there are cams for the cam wheel. There may be only one roller for each cam.

The sets of rollers for each cam wheel 12, 13, or 14 has related with each a roller retainer 20, 21, or 22, each of which is formed in two semicircular parts joined together by the screws or bolts 23 in assembling. Each roller retainer has as many peripheral roller containers 24 as there are sets of rollers for the related cam wheel. Each cam wheel has also another roller retainer 25, 26, 27 respectively, having similar peripheral roller containers 28 and being similarly assembled by bolting together. In the assembly one roller retainer is placed on each side of each cam wheel adapted to cooperate with the ends of the rollers of the cam wheel so that rotational movement of the set of two roller retainers for the cam wheel relatively to the latter will also rotate relatively with the set, the set of rollers of the cam wheel. This rotation relatively need not be but a very few degrees and is rather an oscillation on the axis of the carrier shaft.

Within the carrier shaft 10 there is placed axially a so-called control tube 29 which has rotational mounting relatively to the carrier shaft within it. The control tube 29 has on its exterior surface but within the carrier shaft one short sleeve 30, 31 or 32 for each cam wheel and located relatively in the same transverse section as its cam wheel. The sleeves 30, 31, 32 each have slots into which but not therethrough inwardly projecting lugs 33, 34, 35 of the respective roller retainer sets protrude so that rotational movement of the sleeve will be imparted to the related roller retainer and thus also to the related rollers contained within the related containers.

Exteriorly of the control tube 29 there is placed a short spiral spring 36, 37 or 38 one for each sleeve 30, 31, 32 and each spring has one end fixed to the control tube and the other end to the related sleeve and the rotational tension of the springs is similar so that all the sleeves are normally thrust or tended to be rotated slightly in the same direction relatively to the control tube 29. Each sleeve 30, 31, 32 has midway of its length a pair of slots diametrically spaced and within these slots are the lugs 39, 40, or 41 fixed respectively to short sleeves 42, 43, or 44 each of which is within the control tube and related to one cam wheel.

The lugs 39, 40, 41 may have short rotative movement within their related slots. Each sleeve 42, 43, 44 has related a spiral spring 45, 46 or 47 fixed by one end to control tube 29 by the other to the sleeve 42, 43 or 44 and the tension of each is such as to yieldably impel the related sleeve 42, 43 or 44 and with it its lugs 39, 40 or 41 rotatively against the tension of the springs 36, 37, 38, that is oppositely and this tension of springs 45, 46, 47 is the greater so that the latter will overcome the tension of the former. The movement of the lugs 39, 40, 41 within their slots in sleeves 30, 31, 32 will permit rotational movement of the lugs with respect to axis of control tube 29 away from impingement against sleeves 30, 31 or 32 so as to free the latter from the tension of springs 45, 46, or 47 and thereby permit springs 36, 37 or 38 to impel their related roller retainers and thus their rollers against their related cams and thus into operative relation with the related interior cylindrical face of the related drum or spur gear.

The sleeves 42, 43, 44 are not simultaneously in operation moved relatively but are successively in accordance with the travel speed slightly rotated relatively by means of a governor rod 48 interiorly placed axially within control tube 29. The governor rod has three sets of prongs 49, 50 and 51 which respectively cooperate with the sleeves 42, 43 or 44 so as to successively abut against them and slightly rotate them relatively to control tube 29. The control tube 29 is rotatively fixed within the carrier shaft 10 but the governor rod 48 is rotative relatively to control tube 29. The governor rod 48 passes axially through the worm 9 and at its end opposite to the engine end has a small spur gear 52 formed integral and therewith cooperates the gear racks 53, 54 of two governor arms 55, 56, the latters' weights providing centrifugal force for governing, this force being counteracted by the tension first of one spring 45, then plus 46, then plus 47 as the successive impingement against the sleeves takes place.

The governor rod 48 at its opposite end (engine end) has a dog clutch 57 with which an opposite dog clutch 58 on main clutch disengagement means 59 may cooperate when the engine clutch is engaged but may disconnect when the engine clutch 60 is disengaged by pedal lever 61. (It is noted that the governor rod may in the same way be restrained from action when the accelerator pedal is depressed instead and released when the accelerator pedal is released.)

The carrier shaft 10 has another free wheel cam 62 with which a still lower ratio spur gear 63 will cooperate always for forward driving when the transmission is in condition for forward drive but may free wheel respective to the carrier shaft when a higher speed is engaged. The end of carrier shaft 10 opposite to worm 9 is by main clutch 60 coupled to engine 2.

The spur gears 16, 17 are in constant engagement with the spur gears 64, 65 of secondary shaft 66 and the latter by small mitre gear 67 is in driving engagement with the large mitre gear 6. The driving ratio to mitre gear 6 and worm wheel 7 being different, the worm wheel 7 providing preferably the ratio for most direct drive or lowest ratio, but this may be different.

In the use of my device, the car in which the transmission is used, being at a standstill and the engine being in operation, the operator causes the main clutch to be engaged and thereupon the engine will drive through the highest gear ratio to the secondary shaft and thus through the mitre gears to the wheel axle. In this starting condition the governor weights will not have centrifugal force thereon and therefore they will be contracted toward their axis of revolution by the spiral springs acting between the governor control rod and the control tube and therefore likewise the governor control rod will be so partially revolved through a portion of one revolution that its lugs will be disengaged from contact with the sleeves. Thus the sleeves will be permitted to take their place so partially revolved by the spiral springs outside the control tube that the roller containers of the three gear transmissions above the lowest will be so slightly revolved that they will all have carried their rollers out of the positions of engagement with their respective cams. Thus no transmission gears will be engaged except the two spur gears providing the highest ratio of transmission. If the car is now started traveling, this condition will persist until the speed of travel exceeds a predetermined rate of say six to ten miles per hour and also until the operator depresses the main clutch pedal and when he does so the main clutch will be disengaged and simultaneously or nearly so the dog-clutch related to the governor control rod will be disconnected and thus the governor control rod will be released and permitted to partially revolve under the centrifugal urge of the governor weights a predetermined degree, just enough (if say ten miles per hour is not exceeded) to force the lugs of the governor control rod against the sleeve of the next gear and to force that sleeve out of contact with the lug of the sleeve and thus to permit the related roller container to slightly revolve and carry its rollers into position of engagement between their cams and the interior gear face for engagement of that next gear. The main clutch being reengaged the dog clutch will connect and prevent further revolution of the governor control rod until the main clutch is again disengaged and when the speed has reached say between 15 and 20 miles per hour and when main clutch is disengaged, the governor control rod will again be freed and the increased centrifugal force, by acting on the governor weights, will cause the governor control rod to again revolve slightly so as to engage and carry the next sleeve around sufficiently to disengage it from its related roller container (by its sleeve) and thus the roller container of the next gear ratio will be permitted to carry its rollers into their positions of engagement whereupon that gear will be engaged. Reengagement of the main clutch will cause this condition to persist until speed reaches say between 25 and 30 miles and the operator again causes the dog clutch to be disconnected when the governor control rod will be permitted to again slightly further revolve carrying the sleeve out of contact and permitting the roller container to carry the rollers into contact with their cams for engagement of the next transmission ratio which will be that through the worm and worm wheel by means of the drum. This will be the direct drive. In any case if when the dog-clutch is disconnected by the operator the car is traveling at such a high rate of speed as related to a still lower ratio than the next the intermediate one will be passed through and the next higher or highest (if at high speed) will be engaged. At any time when any lower gear ratio is engaged the gear related to the higher ratios will free wheel and transmission will be only through the engaged ratio. When a high ratio is engaged, as the direct, this will persist until the operator disengages the main clutch or causes idling speed in the engine, whereupon the governor control rod will as the speed of the car declines cause the governor control rod to retrogress revolutionally in the same manner until it occupies its correct relative position corresponding to the speed of travel and if the main clutch is again engaged or the engine caused to pick up speed the proper gear transmission for the rate of travel will be automatically engaged, as this is determined by the governor control rod. At any time when a roller container is not yieldably held so that its rollers are out of engagement by the impingement of the lugs of the governor control rod under the urge of the spiral springs of the latter, that roller container will by the opposed spiral spring be caused to revolve sufficiently so as to carry its rollers into the engaging position. It is to be noted that the spiral springs which cause the disengagement of the rollers by their roller containers are relatively stronger than the spiral springs which will individually cause the engagement of a set of rollers. The governor weights will by their centrifugal force have to overcome progressively the force of the spiral springs on the governor control rod. In the disengagement positions relatively of the rollers they will be so freely revolvable that they will not receive sufficient force to carry them into engagement with their cams. In some constructions the dog-clutch may be omitted so that the governor control rod may freely revolve according to the relative centrifugal force and the tension of the several spiral springs, but in such constructions some yieldable connection would preferably be provided between the engine and driven axle to prevent shock.

While I have shown particular devices and combinations I contemplate that other detailed devices and combinations of devices may be used in the realization of my invention without departing from the spirit and contemplation thereof.

What I claim is:

1. In a transmission means, a driven element and a driving element, a plurality of transmission sets for transmission of driving torque between the elements each set having one member engageable or disengageable, a free wheeling clutch means for each engageable member and yieldable means for normally retaining the clutch means out of engagement and means for overcoming the yieldable means to permit engagement.

2. In a transmission means, a driven element and a driving element, a plurality of transmission sets for transmission of driving torque between the elements each set having one member engageable or disengageable, a free wheeling clutch means for each engageable member and yieldable means for normally retaining the clutch means out of engagement and means for overcoming the yieldable means to permit engagement in accordance with speed controlling means.

3. In a transmission means, a driven member and a driving member, a torque member having related a plurality of transmission members, means coordinated with each transmission member to complete a transmission train, a cluch means for each transmission member adaped to occupy a non-engageable position for overrunning of the transmission member on the torque member, a yieldable means for each clutch means for thrusting it in engageable position with the torque member, and speed regulated control means whereby any clutch means may be held against its yieldable means in the non-engageable position or released.

4. In a transmission means, a driven member and a driving member, a torque member having related a transmission member, means coordinated with the transmission member to complete a transmission train, a clutch means for the transmission member adapted to occupy a non-engageable position for overrunning of the transmission member on the torque member, a yieldable means for thrusting the clutch member in engageable position with the torque member, and control means whereby the clutch means may be held against its yieldable means in the non-engageable position or released.

5. In a transmission means, a driven member and a driving member, a torque member having related a transmission member, means coordinated with the transmission member to complete a transmission train, a clutch means for the transmission member adapted to occupy a non-engageable position for overrunning of the transmission member on the torque member, a yieldable means for thrusting the clutch member in engageable position with the torque member, and speed regulated control means whereby the clutch means may be held against its yieldable means in the non-engageable position or released.

6. In a transmission means, a driven member and a driving member, a carrier shaft having related a transmission member, means coordinated with the transmission member to complete a transmission train, a free wheeling clutch means for the transmission member adapted to occupy a non-engageable position for over-running of the transmission member on the carrier shaft, a yieldable means for thrusting the free wheeing clutch means in engageable position with the carrier shaft transmission member, and control means whereby the free wheeling clutch means may be held against its yieldable means in the non-engageable position or released.

7. In a transmission means, a driven member and a driving member, a carrier shaft having related a transmission member, means coordinated with the transmission member to complete a transmission train, a free wheeling clutch means for the transmission member adapted to occupy a non-engageable position for overrunning of the transmission member on the carrier shaft, a yieldable means for thrusting the free wheeling clutch means in engageable position with the carrier shaft transmission member, and speed-regulated control means whereby the free wheeling clutch means may be held against its yieldable means in the non-engageable position or released.

8. In a transmission means, a driven member and a driving member, a carrier shaft having related a plurality of transmission members, means coordinated with each transmission member to complete a transmission train, a free wheeling clutch means for each transmission member adapted to occupy a non-engageable position for overrunning of the related transmission member on the carrier shaft, and having each a yieldable means for thrusting the free wheeling clutch means in engageable position with the carrier shaft and related transmission member, and control means whereby the several free wheeling clutch means may be held against the yieldable means in the non-engageable positions or selectively released.

9. In a transmission means, a driven member and a driving member, a carrier shaft having related a plurality of transmission members, means coordinated with each transmission member to complete a transmission train, a free wheeling clutch means for each transmission member adapted to occupy a non-engageable position for over-running of the related transmission member on the carrier shaft, and having each a yieldable means for thrusting the free wheeling clutch means in engageable position with the carrier shaft and related transmission member, and speed regulated control means whereby the several free wheeling clutch means may be held against the yieldable means in the non-engageable positions or released.

10. In a transmission means, a driven member and a driving member, a carrier shaft having related a plurality of transmission members, means coordinated with each transmission member to complete a transmission train, a roller clutch set for each transmission member adapted to occupy a non-engageable position for overrunning of the related transmission member on the carrier shaft, and having each a yieldable means for thrusting the roller clutch set in engageable position with the carrier shaft and related transmission member, and control means whereby the several roller clutch sets may be held against the yieldable means in the non-engageable positions or selectively released.

11. In a transmission means, a driven member and a driving member, a carrier shaft, having related a plurality of transmission members, means coordinated with each transmission member to complete a transmission train, a roller clutch set for each transmission member adapted to occupy a non-engageable position for overrunning of the related transmission member on the carrier shaft, and having each a yieldable means for thrusting the roller clutch set in engageable position with the carrier shaft and related transmission member, and speed regulated control means whereby the several roller clutch sets may be held against the yieldable means in the non-engageable positions or selectively released.

12. In a transmission means, a driven member having a pair of transmission wheels revolvable therewith, a carrier shaft, a secondary shaft in revolvable connection with one of the transmission wheels, a transmission member on the carrier shaft cooperable through the secondary shaft and its transmission wheel with the driven member and related means for clutching the transmission member to the carrier shaft, and a clutch means for clutching the carrier shaft by the other transmission wheel for driving connection with the driven member.

13. In a transmission means, a driven member having a pair of transmission wheels revolvable therewith, a carrier shaft, a secondary shaft in revolvable connection with one of the transmission wheels and having revolvable with it a plurality of transmission members, a plurality of transmission members carried revolvably on the carrier shaft and each cooperating with one transmission member on the secondary shaft and related means for independently clutching each carrier shaft transmission member to the carrier shaft, and clutch means for clutching the carrier shaft by the other transmission wheel in driving connection with the driven member.

14. In a transmission means, a driven member having a transmission wheel means rotatable therewith, a primary drive member, a primary gear in permanent operative relation with the transmission wheel means, a secondary shaft having a gear fixed therewith and in permanent operating relation with the transmission wheel means, a transmission member on the primary drive member and a transmission member on the secondary shaft and means whereby these transmission members may be placed in operative relation with the primary drive member and the secondary shaft and means whereby the primary drive member may be clutched with the primary gear.

15. In a transmission means, a driven member having a transmission wheel means rotatable therewith, a primary gear in permanent driving relation with the transmission wheel means, a secondary gear in permanent driving relation with the transmission wheel means, a secondary transmission member in driving relation with the secondary gear, a primary drive member having co-axial therewith a primary clutching means for clutching with the primary gear and having also coaxial therewith a transmission member for engagement of the primary drive member with the secondary transmission member and means whereby the transmission member may be clutched with or declutched from the primary drive member.

ADOLPHE C. PETERSON.